United States Patent
Lucas et al.

(10) Patent No.: US 11,518,907 B2
(45) Date of Patent: Dec. 6, 2022

(54) WATER-EMULSIFIABLE ISOCYANATES WITH IMPROVED PROPERTIES

(71) Applicant: BASF SE, Ludwigshafen am Rhein (DE)

(72) Inventors: Frederic Lucas, Ludwigshafen (DE); Rabie Al-Hellani, Ludwigshafen (DE)

(73) Assignee: BASF SE

( * ) Notice: Subject to any disclaimer, the term of this patent is extended or adjusted under 35 U.S.C. 154(b) by 336 days.

(21) Appl. No.: 16/469,529

(22) PCT Filed: Dec. 5, 2017

(86) PCT No.: PCT/EP2017/081519
§ 371 (c)(1),
(2) Date: Jun. 13, 2019

(87) PCT Pub. No.: WO2018/108631
PCT Pub. Date: Jun. 21, 2018

(65) Prior Publication Data
US 2020/0115588 A1 Apr. 16, 2020

(30) Foreign Application Priority Data

Dec. 14, 2016 (EP) .................... 16203923

(51) Int. Cl.
| C09D 175/14 | (2006.01) |
| C08G 18/12 | (2006.01) |
| C08G 18/48 | (2006.01) |
| C08G 18/67 | (2006.01) |
| C08G 18/72 | (2006.01) |
| C08G 18/73 | (2006.01) |
| C08G 18/75 | (2006.01) |
| C08G 18/79 | (2006.01) |
| C08G 18/28 | (2006.01) |
| C08G 18/80 | (2006.01) |
| C08G 18/70 | (2006.01) |
| C08G 18/62 | (2006.01) |

(52) U.S. Cl.
CPC .......... *C09D 175/14* (2013.01); *C08G 18/12* (2013.01); *C08G 18/283* (2013.01); *C08G 18/4833* (2013.01); *C08G 18/622* (2013.01); *C08G 18/6755* (2013.01); *C08G 18/706* (2013.01); *C08G 18/722* (2013.01); *C08G 18/73* (2013.01); *C08G 18/755* (2013.01); *C08G 18/792* (2013.01); *C08G 18/8064* (2013.01)

(58) Field of Classification Search
CPC .............. C08G 18/12; C08G 18/4833; C08G 18/6755; C08G 18/722; C08G 18/73; C08G 18/755; C08G 18/792; C08G 18/283; C08G 18/8064; C08G 18/706; C08G 18/622; C09D 175/14
See application file for complete search history.

(56) References Cited

U.S. PATENT DOCUMENTS

| 3,479,310 A | 11/1969 | Dieterich et al. |
| 3,769,318 A | 10/1973 | Windemuth et al. |
| 4,092,286 A | 5/1978 | Noll et al. |
| 4,108,814 A | 8/1978 | Reiff et al. |
| 4,190,566 A | 2/1980 | Noll et al. |
| 4,596,678 A | 6/1986 | Merger et al. |
| 4,596,679 A | 6/1986 | Hellbach et al. |
| 5,087,739 A | 2/1992 | Bohmholdt et al. |
| 6,777,523 B1* | 8/2004 | Laas ................. C08G 18/6254 252/182.22 |
| 2005/0239989 A1 | 10/2005 | Haberle et al. |
| 2005/0245675 A1* | 11/2005 | Haberle ............... C08G 18/706 524/589 |

FOREIGN PATENT DOCUMENTS

| CA | 2272361 | * 11/1999 |
| DE | 26 51 505 A1 | 5/1978 |
| DE | 27 32 131 A1 | 1/1979 |
| DE | 28 11 148 A1 | 9/1979 |
| DE | 35 21 618 A1 | 12/1986 |
| DE | 40 01 783 A1 | 7/1991 |
| DE | 42 03 510 A1 | 6/1993 |
| DE | 100 13 186 A1 | 9/2001 |

(Continued)

OTHER PUBLICATIONS

Odian, G., Principles of Polymerization, Third Edition, 1991, John Wiley & Sons, Inc., pp. 19-24.*

(Continued)

*Primary Examiner* — Patrick D Niland
(74) *Attorney, Agent, or Firm* — Faegre Drinker Biddle & Reath LLP

(57) ABSTRACT

A mixture of water-emulsifiable isocyanates is described. The mixture contains (A) at least one polyisocyanate (a), (B) at least one emulsifier obtained by reacting at least one polyisocyanate with at least one polyether alcohol having a molecular weight of less than 400 g/mol, (C) at least one emulsifier obtained by reacting at least one polyisocyanate with at least one polyether alcohol having a molecular weight of greater than 450 g/mol, and (D) optionally at least one emulsifier obtained by reacting a polyisocyanate with at least one compound (d) having at least one hydrophilic, non-isocyanate-reactive group and precisely one isocyanate-reactive group (group D2). The weight ratio of component (B) to component (C) in the mixture is from 30:70 to 70:30, preferably from 40:60 to 60:40.

13 Claims, No Drawings

(56) References Cited

FOREIGN PATENT DOCUMENTS

| | | |
|---|---|---|
| DE | 100 13 187 A1 | 10/2001 |
| DE | 101 61 156 A1 | 6/2003 |
| EP | 0 000 194 A1 | 1/1979 |
| EP | 0 126 299 A1 | 11/1984 |
| EP | 0 126 300 A1 | 11/1984 |
| EP | 0 206 059 A2 | 12/1986 |
| EP | 0 355 443 A2 | 2/1990 |
| EP | 0 540 985 A1 | 5/1993 |
| EP | 0 649 866 A1 | 4/1995 |
| EP | 0 697 424 A1 | 2/1996 |
| EP | 1 530 604 | 5/2005 |
| EP | 2 368 926 A1 | 9/2011 |
| GB | 994890 | 6/1965 |
| GB | 1076688 | 7/1967 |
| WO | WO 2004/022623 A1 | 3/2004 |
| WO | WO 2005/087828 A1 | 9/2005 |
| WO | WO 2008/068198 A1 | 6/2008 |

OTHER PUBLICATIONS

International Search Report dated Feb. 27, 2018 in PCT/EP2017/081519 filed on Dec. 5, 2017.

\* cited by examiner

WATER-EMULSIFIABLE ISOCYANATES WITH IMPROVED PROPERTIES

The invention lies in particular in the field of water-emulsifiable polyisocyanates. Water-emulsifiable polyisocyanates are typically added as crosslinking agents to aqueous polymer dispersions and are widely described per se in the literature. The water-emulsifiability can be achieved by blending polyisocyanates with emulsifiers obtained by reaction of polyisocyanates with hydrophilic compounds.

The invention relates to mixtures which comprise
(A) at least one polyisocyanate (a),
(B) at least one emulsifier obtainable by reacting at least one polyisocyanate with at least one polyether alcohol, the polyether alcohol having a molecular weight of less than 400 g/mol,
(C) at least one emulsifier obtainable by reacting at least one polyisocyanate with at least one polyether alcohol, the polyether alcohol having a molecular weight of greater than 450 g/mol, and
(D) optionally at least one emulsifier obtainable by reacting a polyisocyanate with at least one compound (d) having at least one hydrophilic, non-isocyanate-reactive group (group D1) and precisely one isocyanate-reactive group (group D2),
where the weight ratio of component (B) to component (C) is from 30:70 to 70:30, preferably from 40:60 to 60:40.

The invention further relates to aqueous polymer dispersions and also to coating materials comprising these mixtures. The invention relates, furthermore, to a process for coating substrates using such mixtures as coating compositions, and also to the use of the mixtures as coating compositions.

Preferred embodiments are apparent from the description. Combinations of preferred embodiments are within the scope of this invention.

Hydrophilic molecules commonly used are nonionic hydrophilic molecules such as polyalkylene oxide alcohols.

EP-A2 206 059 describes water-dispersible polyisocyanate preparations formed from an aliphatic polyisocyanate and from a reaction product of an aliphatic polyisocyanate with a mono- or polyhydric, nonionic polyalkylene ether alcohol with at least one polyether chain containing at least 10 ethylene oxide units, as emulsifier. Regarding suitable polyisocyanates, extensive lists are given of aliphatic and cycloaliphatic diisocyanates, particular preference being given to isocyanurates and biurets based on 1,6-diisocyanatohexane (HDI) and/or isocyanurates based on 1-isocyanato-3,5,5-trimethyl-5-isocyanatomethylcyclohexane (IPDI).

EP-A1 540 985 likewise describes polyisocyanate mixtures, with the polyether chains here, however, having an average ethylene oxide units content of 5.0 to 9.9. WO2004/022623 describes polyisocyanate mixtures comprising an isocyanurate and/or biuret of 1,6-diisocyanatohexane, an isocyanurate of IPDI, and an emulsifier.

A disadvantage of the polyisocyanate mixtures described is that they fail to satisfy the requirements imposed in terms of the incorporability by stirring and the gloss of the coatings obtainable therewith.

To improve their dispersibility, water-emulsifiable isocyanates can be dissolved in organic solvents such as carbonic esters or lactones, for example, as described in EP-A 697424.

From "Lackharze" (edited by D. Stoye and W. Freitag, Hanser 1996, p. 195) it is known that IPDI trimer, which gives film-forming resins a comparatively high hardness, even going as far as brittleness, is frequently employed in blends with HDI derivatives in order to lessen the hardness.

A user requires a water-emulsifiable isocyanate to have the following properties:
1. The isocyanate is to be easy to emulsify; having to use demanding apparatus such as high-shear stirring elements, for example, is deprecated.
2. The emulsion is to be fine, since otherwise the gloss may be disrupted or turbidities may appear, for example.
3. With coatings, a frequent desire is for a high ultimate hardness.
4. The ultimate hardness is to be attained as quickly as possible.

It was an object of the present invention to provide water-emulsifiable polyisocyanates which display improved emulsifiability properties and with which at the same time it is possible to produce coatings of high gloss.

The object has been achieved by means of mixtures comprising
(A) at least one polyisocyanate (a),
(B) at least one emulsifier obtainable by reacting at least one polyisocyanate with at least one polyether alcohol, the polyether alcohol having a molecular weight of less than 400 g/mol,
(C) at least one emulsifier obtainable by reacting at least one polyisocyanate with at least one polyether alcohol, the polyether alcohol having a molecular weight of greater than 450 g/mol, and
(D) optionally at least one emulsifier obtainable by reacting a polyisocyanate with at least one compound (d) having at least one hydrophilic, non-isocyanate-reactive group (group D1) and precisely one isocyanate-reactive group (group D2),
where the weight ratio of component (B) to component (C) is from 30:70 to 70:30, preferably from 40:60 to 60:40.

The mixtures of the invention exhibit ready emulsifiability, lead to a stable and fine emulsion, and can be used to obtain coatings displaying high gloss.

Also found have been polymer dispersions and also coating materials which comprise these mixtures, and also processes for coating substrates using such mixtures as coating compositions, and the use of the mixtures as coating compositions.

Preferred embodiments are apparent from the description. Combinations of preferred embodiments are within the scope of this invention.

The mixture comprises at least one polyisocyanate (a) as component (A).

At least one polyisocyanate means one polyisocyanate or a mixture of two or more polyisocyanates of differing composition.

It is understood that the expression "one polyisocyanate" likewise encompasses a mixture of polyisocyanates which differ only in terms of their chain length and/or in the arrangement of the monomers in the polymer chain.

The at least one polyisocyanate (a) can be prepared by polymerization of monomeric aromatic, aliphatic and/or cycloaliphatic isocyanates, preferably of aliphatic and/or cycloaliphatic (in this text referred to as (cyclo)aliphatic for short) isocyanates and particularly preferably of aliphatic isocyanates.

Aromatic isocyanates are isocyanates which comprise at least one aromatic ring system, i.e. either purely aromatic compounds or aralphatic compounds. The former are isocyanates in which the isocyanato groups are bound directly to aromatic ring systems, while in the case of the latter the isocyanato groups are bound to alkylene groups but the compounds also comprise aromatic ring systems, as is the case, for example, in α,α,α',α'-tetramethylxylylene 1,3-diisocyanate (TMXDI).

Cycloaliphatic isocyanates are ones which comprise at least one cycloaliphatic ring system. Aliphatic isocyanates are ones which comprise exclusively linear or branched carbon chains, i.e. acyclic compounds.

The monomeric aromatic, aliphatic and/or cycloaliphatic isocyanates can in each case be identical or different isocyanates.

The monomeric aromatic, aliphatic and/or cycloaliphatic isocyanates are preferably diisocyanates which carry precisely two isocyanate groups. However, they can in principle also be monoisocyanates having one isocyanate group.

Higher isocyanates having an average of more than two isocyanate groups are also possible in principle. Examples of suitable compounds of this type are triisocyanates such as triisocyanatononane, 2'-isocyanatoethyl 2,6-diisocyanatohexanoate, 2,4,6-triisocyanatotoluene, triphenylmethane triisocyanate or 2,4,4'-triisocyanatodiphenyl ether or the mixtures of diisocyanates, triisocyanates and higher polyisocyanates.

The monomeric aromatic, aliphatic and/or cycloaliphatic isocyanates have no significant reaction products of the isocyanate groups with themselves.

The monomeric aromatic, aliphatic and/or cycloaliphatic isocyanates are preferably isocyanates having from 4 to 20 carbon atoms. Examples of customary diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate (e.g. methyl or ethyl 2,6-diisocyanatohexanoate), trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)-methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4- or 2,6-diisocyanato-1-methylcyclohexane and also 3- (or 4-), 8- (or 9-)bis(isocyanatomethyl)tricyclo[5.2.1.02.6]decane isomer mixtures, and also aromatic diisocyanates such as tolylene 2,4- or 2,6-diisocyanate and isomer mixtures thereof, m- or p-xylylene diisocyanate, 2,4'- or 4,4'-diisocyanatodiphenylmethane and isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diiso-cyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Particular preference is given to hexamethylene 1,6-diisocyanate, 1,3-bis(isocyanatomethyl)-cyclohexane, isophorone diisocyanate and 4,4'- or 2,4'-di(isocyanatocyclohexyl)methane, with very particular preference being given to isophorone diisocyanate and hexamethylene 1,6-diisocyanate.

Mixtures of the isocyanates mentioned can also be present.

Isophorone diisocyanate is usually present as a mixture, namely of the cis and trans isomers, generally in a ratio of from about 60:40 to 90:10 (w/w), preferably from 70:30 to 90:10.

Dicyclohexylmethane 4,4'-diisocyanate can likewise be present as a mixture of the various cis and trans isomers.

As diisocyanates, it is possible to use both diisocyanates which are obtained by phosgenation of the corresponding amines and also those which are prepared without the use of phosgene, i.e. by phosgene-free processes. For example, according to EP-A-126 299 (U.S. Pat. No. 4,596,678), EP-A-126 300 (U.S. Pat. No. 4,596,679) and EP-A-355 443 (U.S. Pat. No. 5,087,739), (cyclo)aliphatic diisocyanates, e.g. hexamethylene 1,6-diisocyanate (HDI), isomeric aliphatic diisocyanates having 6 carbon atoms in the alkylene radical, 4,4'- or 2,4'-di(isocyanatocyclohexyl)methane and 1-isocyanato-3-isocyanatomethyl-3,5,5-trimethylcyclohexane (isophorone diisocyanate or IPDI) can be prepared by reaction of (cyclo)aliphatic diamines with, for example, urea and alcohols to form (cyclo)aliphatic biscarbamic esters and thermal dissociation of these into the corresponding diisocyanates and alcohols. The synthesis is usually carried out continuously in a circulatory process and optionally in the presence of N-unsubstituted carbamic esters, dialkyl carbonates and other by-products recirculated from the reaction process. Diisocyanates obtained in this way generally have a very small or even unmeasurable proportion of chlorinated reaction products, which is advantageous, for example, in applications in the electronics industry, without being restricted thereto.

It can be advantageous for the isocyanates used to have a total content of hydrolyzable chlorine of less than 200 ppm, preferably less than 120 ppm, particularly preferably less than 80 ppm, very particularly preferably less than 50 ppm, in particular less than 15 ppm and especially less than 10 ppm. This can, for example, be measured according to the ASTM method D4663-98. However, it is of course also possible to use monomeric isocyanates having a higher chlorine content, for example up to 500 ppm.

It is of course also possible to use mixtures of monomeric isocyanates which have been obtained by reaction of the (cyclo)aliphatic diamines with, for example, urea and alcohols and dissociation of the resulting (cyclo)aliphatic biscarbamic esters with diisocyanates which have been obtained by phosgenation of the corresponding amines.

The at least one polyisocyanate (a) to which the monomeric isocyanates can be polymerized generally has the following characteristics:

The average NCO functionality of the at least one polyisocyanate (a) is generally at least 1.8 and can be up to 8, for example up to 6, preferably from 2 to 5 and particularly preferably from 2.4 to 4.

The content of isocyanate groups after the polymerization, calculated as NCO=42 g/mol, is, unless indicated otherwise, generally from 5 to 30% by weight.

The at least one polyisocyanate (a) comprises preferably the following compounds:

1) one or more polyisocyanates having isocyanurate groups derived from aromatic, aliphatic and/or cycloaliphatic diisocyanates. Particular preference is given here to the corresponding aliphatic and/or cycloaliphatic isocyanatoisocyanurates and in particular those based on hexamethylene diisocyanate and isophorone diisocyanate. The isocyanurates present here are, in particular, trisisocyanatoalkyl or trisisocyanato-cycloalkyl isocyanurates, which represent cyclic trimers of the diisocyanates, or mixtures with their higher homologs having more than one isocyanurate ring. The isocyanatoisocyanurates generally have an NCO content of from 10 to 30% by weight, in particular from 15 to 25% by weight, and an average NCO functionality of from 2.6 to 8. The polyisocyanates having isocyanurate groups can also contain smaller amounts of urethane and/or allophanate groups, preferably with a content of bound alcohol of less than 2% by weight based on the polyisocyanate.

2) one or more polyisocyanates having uretdione groups and aromatically, aliphatically and/or cycloaliphatically bound isocyanate groups, preferably aliphatically and/or cycloaliphatically bound isocyanate groups, and in particular those derived from hexamethylene diisocyanate or isophorone diisocyanate. Uretdione diisocyanates are cyclic dimerization products of diisocyanates.

Polyisocyanates having uretdione groups are frequently obtained in admixture with other polyisocyanates, in particular those mentioned under item 1). Polyisocyanates having uretdione groups usually have NCO functionalities of from 2 to 3.

For this purpose, the diisocyanates can be reacted under reaction conditions under which both uretdione groups and also the other polyisocyanates are formed, or the uretdione groups are formed first and these are subsequently converted into the other polyisocyanates or the diisocyanates are firstly reacted to form the other polyisocyanates and these are subsequently converted into products comprising uretdione groups.

3) one or more polyisocyanates having biuret groups and aromatically, cycloaliphatically or aliphatically bound, preferably cycloaliphatically or aliphatically bound, isocyanate groups, in particular tris(6-isocyanatohexyl) biuret or mixtures thereof with its higher homologs. These polyisocyanates having biuret groups generally have an NCO content of from 18 to 24% by weight and an average NCO functionality of from 2.8 to 6.

4) one or more polyisocyanates having urethane and/or allophanate groups and aromatically, aliphatically or cycloaliphatically bound, preferably aliphatically or cycloaliphatically bound, isocyanate groups, as are obtained, for example, by reaction of excesses of diisocyanate, for example hexamethylene diisocyanate or isophorone diisocyanate, with monohydric or polyhydric alcohols. These polyisocyanates having urethane and/or allophanate groups generally have an NCO content of from 12 to 24% by weight and an average NCO functionality of from 2.0 to 4.5.

Such polyisocyanates having urethane and/or allophanate groups can be prepared in the absence of catalysts or preferably in the presence of catalysts, for example ammonium carboxylates or ammonium hydroxides or allophanatization catalysts, e.g. bismuth compounds, cobalt compounds, cesium compounds, Zn(II) or Zr(IV) compounds, in each case in the presence of monohydric, dihydric or polyhydric, preferably monohydric, alcohols.

Polyisocyanates having urethane and/or allophanate groups frequently occur in mixed forms with the polyisocyanates mentioned under item 1).

5) one or more polyisocyanates comprising oxadiazinetrione groups, preferably derived from hexamethylene diisocyanate or isophorone diisocyanate. Such polyisocyanates comprising oxadiazinetrione groups can be obtainable from diisocyanate and carbon dioxide.

6) one or more polyisocyanates comprising iminooxadiazinedione groups, preferably derived from hexamethylene diisocyanate or isophorone diisocyanate. Such polyisocyanates comprising iminooxadiazinedione groups can be prepared, for example, from diisocyanates by means of specific catalysts.

7) one or more uretonimine-modified polyisocyanates.

8) one or more carbodiimide-modified polyisocyanates.

9) one or more hyperbranched polyisocyanates as are known, for example, from DE-A 10013186 or DE-A 10013187.

10) the polyisocyanates 1)-9) described under the abovementioned items, preferably 1), 2), 3), 4) and 6), can, after they have been prepared, be converted into polyisocyanates having biuret groups or urethane/allophanate groups and aromatically, cycloaliphatically or aliphatically bound, preferably (cyclo)aliphatically bound, isocyanate groups. The formation of biuret groups is effected, for example, by addition of water or reaction with amines. The formation of urethane and/or allophanate groups is effected by reaction with monohydric, dihydric or polyhydric, preferably monohydric, alcohols, optionally in the presence of suitable catalysts. These polyisocyanates having biuret or urethane/allophanate groups generally have an NCO content of from 10 to 25% by weight and an average NCO functionality of from 3 to 8.

11) polyisocyanates which comprise not only the groups described under 1) to 10) but also groups which are formally formed by addition of molecules having NCO-reactive groups and groups which are crosslinkable by means of UV or actinic radiation onto the isocyanate groups of the above molecules. These molecules are, for example, hydroxyalkyl (meth)acrylates and other hydroxyvinyl compounds.

The diisocyanates or polyisocyanates described above can also be present at least partly in blocked form.

Classes of compounds used for blocking are described in D. A. Wicks, Z. W. Wicks, Progress in Organic Coatings, 36, 148-172 (1999), 41, 1-83 (2001) and 43, 131-140 (2001).

Examples of classes of compounds used for blocking are phenols, imidazoles, triazoles, pyrazoles, oximes, N-hydroxyimides, hydroxybenzoic esters, secondary amines, lactams, CH-acidic cyclic ketones, malonic esters or alkyl acetoacetates.

It can be advantageous for the at least one polyisocyanate (a) to be selected from the group consisting of isocyanurates, biurets, urethanes and allophanates, preferably from the group consisting of isocyanurates, urethanes and allophanates, with particular preference being given to a polyisocyanate comprising isocyanurate and/or biuret groups.

The at least one polyisocyanate (a) is particularly preferably a polyisocyanate based on aliphatic or cycloaliphatic diisocyanates, very particularly preferably based on hexamethylene 1,6-diisocyanate or isophorone diisocyanate.

Further particular preference is given to the at least one polyisocyanate (a) being a mixture of polyisocyanates, very particularly preferably polyisocyanates based on hexamethylene 1,6-diisocyanate and polyisocyanates based on isophorone diisocyanate.

Very preferably the at least one polyisocyanate (a) comprises at least one polyisocyanate (a1) and at least one polyisocyanate (a2).

The at least one polyisocyanate (a1) is an isocyanurate and/or biuret of 1,6-diisocyanatohexane (HDI). In accordance with the invention this embraces polyisocyanates of which at least 50%, preferably at least 66%, more preferably at least 75%, very preferably at least 85% and more particularly at least 95% by weight are compounds of the formula (Ia) and/or (Ib),

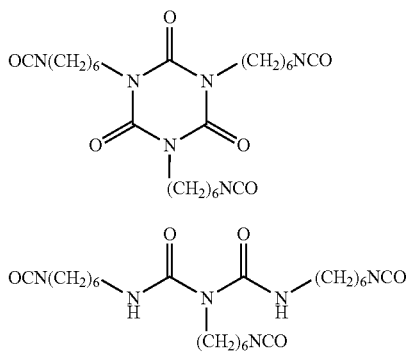

and also their higher homologs.

The composition of the polyisocyanates, that is, for example, the fractions of isocyanurates and/or biurets and their higher homologs, and also the average functionality, are determined in this specification by means of gel permeation chromatography with polystyrene as standard and tetrahydrofuran as eluent.

The at least one polyisocyanate (a2) is an isocyanurate of 1-isocyanato-3,5,5-trimethyl-5-isocyanatomethylcyclohexane (IPDI). In accordance with the invention this embraces polyisocyanates of which at least 50%, preferably at least 66%, more preferably at least 75%, very preferably at least 85% and more particularly at least 95% by weight are the compound of the formula (II),

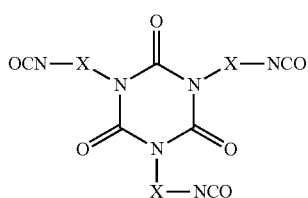

in which X is

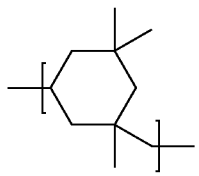

and also higher homologs thereof.

The at least one polyisocyanate (a) can, for example, be prepared by methods known to those skilled in the art.

The process for preparing the at least one polyisocyanate (a) can be carried out as described in WO 2008/68198, there in particular on page 20, line 21 to page 27, line 15, which is hereby incorporated by reference into the present patent application.

The reaction can, for example, be stopped as described there on page 31, line 19 to page 31, line 31 and the work-up can be carried out as described there on page 31, line 33 to page 32, line 40, which is in each case incorporated by reference into the present patent application.

The reaction can, as an alternative, also be stopped as described in WO 2005/087828 on page 11, line 12 to page 12, line 5, which is hereby incorporated by reference into the present patent application.

In the process for preparing the at least one polyisocyanate (a), it is possible to use both catalysts which are not thermally labile and catalysts which are thermally labile.

If thermally labile catalysts are used in the process for preparing the at least one polyisocyanate (a), it is also possible to stop the reaction by heating the reaction mixture to a temperature above at least 80° C., preferably at least 100° C., particularly preferably at least 120° C. Just the heating of the reaction mixture as is necessary to separate off the unreacted isocyanate by distillation in the work-up is generally sufficient for this purpose.

Both in the case of catalysts which are not thermally labile and in the case of thermally labile catalysts, it is possible to stop the reaction at lower temperatures by addition of deactivators. Suitable deactivators are, for example, hydrogen chloride, phosphoric acid, organic phosphates such as dibutyl phosphate or diethylhexyl phosphate, carbamates such as hydroxyalkyl carbamate or organic carboxylic acids.

These compounds are added neat or diluted in a suitable concentration required for terminating the reaction.

Diisocyanates, triisocyanates and higher polyisocyanates can, for example, be obtained by phosgenation of corresponding aniline/formaldehyde condensates and can be polyphenyl polyisocyanates having methylene bridges.

The mixture comprises as component (B) at least one emulsifier obtainable by reacting at least one polyisocyanate with at least one polyether alcohol, the polyether alcohol having a molecular weight of less than 400 g/mol.

The polyether alcohol in component (B) preferably has a molecular weight of 200 g/mol to 400 g/mol.

The mixture comprises as component (C) at least one emulsifier obtainable by reacting at least one polyisocyanate with at least one polyether alcohol, the polyether alcohol having a molecular weight of greater than 450 g/mol.

The polyether alcohol in component (C) preferably has a molecular weight of 450 g/mol to 650 g/mol.

The at least one polyisocyanate used in component (B) and/or component (C) may be the same as or different from the at least one polyisocyanate (a). The at least one polyisocyanate used in component (B) and/or component (C) is preferably the same as the at least one polyisocyanate (a). The at least one polyisocyanate used in component (B) and/or component (C) may be any polyisocyanate, preferably a polyisocyanate as described in component (A). More preferably the at least one polyisocyanate in component (B) and/or component (C) comprises at least one polyisocyanate (a1) and/or at least one polyisocyanate (a2).

The weight ratio of component (B) to component (C) is from 30:70 to 70:30, more preferably from 40:60 to 60:40.

Polyether alcohols are obtainable by alkoxylation of suitable starter molecules. Suitable starter molecules for the preparation of monohydric polyether alcohols are thiol compounds, monohydroxy compounds of the general formula $R^1-O-H$ or secondary monoamines of the general formula $R^2R^3N-H$ in which $R^1$, $R^2$ and $R^3$ independently of one another are each $C_1-C_{18}$ alkyl, $C_2-C_{18}$ alkyl uninterrupted or interrupted by one or more oxygen and/or sulfur atoms and/or by one or more substituted or unsubstituted imino groups, or are $C_6$-$C_{12}$ aryl, $C_5$-$C_{12}$ cycloalkyl or a five- or six-membered heterocycle containing oxygen, nitrogen and/or sulfur atoms, or $R^2$ and $R^3$ together form an unsaturated, saturated or aromatic ring whose members are uninterrupted or interrupted by one or more oxygen and/or sulfur atoms and/or by one or more substituted or unsubstituted imino groups, it being possible for the radicals mentioned each to be substituted by functional groups, aryl, alkyl, aryloxy, alkyloxy, halogen, heteroatoms and/or heterocycles.

Preferably $R^1$ is $C_1$ to $C_4$ alkyl, i.e., methyl, ethyl, isopropyl, n-propyl, n-butyl, iso-butyl, sec-butyl or tert-butyl; very preferably $R^1$ is methyl.

Examples of suitable monofunctional starter molecules may be saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, cyclopentanol, the isomeric methylcyclohexanols or hydroxymethylcyclohexane, 3-ethyl-3-hydroxymethyloxetane, or tetrahydrofurfuryl alcohol; unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol; secondary monoamines such as dimethylamine, diethylamine, dipropylamine, diisopropylamine, di-n-butylamine, diisobutylamine, bis(2-ethylhexyl)amine, N-methyl- and N-ethylcyclohexylamine or dicyclohexylamine, heterocyclic secondary amines such as morpholine, pyrrolidine, piperidine or 1 H-pyrazole, and also amino alcohols such as 2-dimethylaminoethanol, 2-diethylaminoethanol, 2-diisopropylaminoethanol, 2-dibutylaminoethanol, 3-(dimethylamino)-1-propanol or 1-(dimethylamino)-2-propanol.

Alkylene oxides suitable for the alkoxylation reaction are ethylene oxide, propylene oxide, isobutylene oxide, vinyloxirane and/or styrene oxide, which may be used in any order or else in a mixture in the alkoxylation reaction.

Preferred alkylene oxides are ethylene oxide, propylene oxide and mixtures thereof, with ethylene oxide being particularly preferred.

Preferred compounds are polyether alcohols prepared using saturated aliphatic or cycloaliphatic alcohols of the abovementioned type as starter molecules. Very particular preference is given to those polyether alcohols prepared using saturated aliphatic alcohols having 1 to 4 carbon atoms in the alkyl radical. Polyether alcohols prepared starting from methanol are especially preferred.

Preferred polyether alcohols are, therefore, compounds of the formula

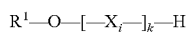

where $R^1$ has the definitions stated above, k is integer and each $X_i$ for i=1 to k may be selected independently of one another from the group of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin—O—, —CHVin—$CH_2$—O—, —$CH_2$—CHPh- O— and —CHPh- $CH_2$—O—, preferably from the group —$CH_2$—$CH_2$—O—, —$CH_2$—$CH(CH_3)$—O— and —$CH(CH_3)$—$CH_2$—O—, and more preferably —$CH_2$—$CH_2$—O—, wherein Ph is phenyl and Vin is vinyl.

For the reaction of the at least one polyisocyanate with the polyether alcohols, it is usual to use 60 to 120, preferably 80 to 120, more preferably 90 to 110 and more particularly 100 mol % of isocyanate-reactive groups in the polyether alcohols per mole of isocyanate groups in the at least one polyisocyanate.

For preparing the components (B) and (C) which are active as emulsifier, the polyisocyanates and the polyether alcohol are reacted with one another at temperatures of 40 to 180° C., preferably 50 to 150° C., with preference while observing the stated molar ratio.

The reaction time is generally 10 min to 5 hours, preferably 15 min to 4 hours, more preferably 20 to 180 min, and very preferably 30 to 150 min.

In order to accelerate the reaction it is possible optionally to use suitable catalysts.

These are the customary catalysts which are known for these purposes, examples being metal carboxylates, metal chelates or tertiary amines of the type described in GB-A-0 994 890, alkylating agents of the type described in U.S. Pat. No. 3,769,318, or strong acids as described by way of example in EP-A-0 000 194.

Suitable catalysts are, in particular, zinc compounds, such as zinc(II) stearate, zinc(II) n-octanoate, zinc(II) 2-ethyl-1-hexanoate, zinc(II) naphthenate or zinc(II) acetylacetonate, tin compounds, such as tin(II) n-octanoate, tin(II) 2-ethyl-1-hexanoate, tin(II) laurate, dibutyltin oxide, dibutyltin dichloride, dibutyltin diacetate, dibutyltin dilaurate, dibutyltin dimaleate or dioctyltin diacetate, aluminum tri(ethyl acetoacetate), iron(III) chloride, potassium octoate, manganese compounds, cobalt compounds or nickel compounds, and strong acids, such as trifluoroacetic acid, sulfuric acid, hydrogen chloride, hydrogen bromide, phosphoric acid or perchloric acid, for example, or any desired mixtures of these catalysts.

Suitable though less preferred catalysts for the process are also those catalysts as described for example in EP-A-0 649 866 on page 4 line 7 to page 5 line 15.

Preferred catalysts for the process of the invention are zinc compounds of the abovementioned type. Very particular preference is given to using zinc(II) n-octanoate, zinc(II) 2-ethyl-1-hexanoate and/or zinc(II) stearate.

If at all, these catalysts are employed in an amount of 0.001 to 5% by weight, preferably 0.005 to 1% by weight, based on the overall weight of the reactants.

The polyaddition reaction for preparing the polyurethane formulation of the invention may take place with particular preference in the presence of cesium salts, as described in the earlier German patent application of Dec. 12, 2001 with the file reference 10161156.0. Preferred cesium salts are compounds in which the following anions are employed: $F^-$, $Cl^-$, $ClO^-$, $ClO_3^-$, $ClO_4^-$, $Br^-$, $I^-$, $IO_3^-$, $CN^-$, $OCN^-$, $NO_3^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$, and $(C_{n+1}H_{2n-2}O_4)^{2-}$, n standing for the numbers 1 to 20.

Particularly preferred compounds are cesium carboxylates in which the anion is of the formulae $(C_nH_{2n-1}O_2)^-$ and $(C_{n+1}H_{2n-2}O_4)^{2-}$, where n is 1 to 20.

Especially preferred cesium salts contain monocarboxylate anions of the general formula $(C_nH_{2n-1}O_2)^-$ where n stands for the numbers 1 to 20.

Particular mention may be made here of formate, acetate, propionate, hexanoate, and 2-ethylhexanoate.

The cesium salts are used in amounts of 0.01 to 10 mmol of cesium salt per kg of solvent-free reaction mixture. They are preferably used in amounts of 0.05 to 2 mmol of cesium salt per kg of solvent-free reaction mixture.

The cesium salts can be added to the reaction mixture in solid form, but preferably in dissolved form. Suitable solvents are polar, aprotic solvents or else protic solvents. Particularly suitable besides water are also alcohols; especially suitable are polyols, such as are also otherwise used as synthesis units for polyurethanes, such as ethane-, propane-, and butanediols, for example. The use of the cesium salts makes it possible to carry out the polyaddition reaction under the customary conditions.

Addition to the reaction mixture may take place by any desired methods. Thus, for example, it is possible to admix the catalyst, where used, either to the polyisocyanate component and/or to the polyether alcohol before the beginning of the actual reaction. It is also possible to add the catalyst to the reaction mixture at any time during the reaction or else, in a two-stage reaction regime, following the urethanization, i.e., when the NCO content corresponding theoretically to complete conversion of isocyanate and hydroxyl groups has been reached.

In accordance with the invention, the sequence in which the components (A), (B) and (C) are mixed is not critical. For the preparation of the mixtures of the invention, the polyether alcohol may be reacted with a portion of the component (A) and subsequently mixed with the remainder of the components (A).

Alternatively the preparation may take place by adding the polyether alcohol to the total amount of the component (A) and then carrying out the reaction in the same reaction vessel.

For example, the components may also be mixed simultaneously with one another, (B) and (C) may be at least partly included in the initial charge, and (A) may be added thereto, or (A) may be included at least partially in the initial charge, (B) and (C) added thereto, and the last component added.

The course of the reaction can be monitored by determining the NCO content by means, for example, of titrimetry. When the target NCO content has been reached the reaction is terminated. In the case of a purely thermal reaction regime, this can be done, for example, by cooling the reaction mixture to room temperature. Where a catalyst of the aforementioned type is used, however, the reaction is generally stopped by adding suitable deactivators. Examples of suitable deactivators include organic or inorganic acids, the corresponding acid halides, and alkylating agents. Examples that may be mentioned include phosphoric acid, monochloroacetic acid, dodecylbenzenesulfonic acid, p-toluenesulfonic acid, benzoyl chloride, dimethyl sulfate, and, preferably, dibutyl phosphate and also di-2-ethylhexyl phosphate. The deactivating agents can be used in amounts of 1 to 200 mol %, preferably 20 to 100 mol %, based on the moles of catalyst.

The resultant polyisocyanate mixtures generally have an NCO content of preferably 6.0 to 23.0% by weight, more preferably 8.5 to 22.0% by weight.

The resulting polyisocyanate mixtures generally have a viscosity at 23° C. of preferably 500 to 8000 mPas, more preferably 800 to 4000 mPas.

The process may be carried out optionally in a suitable solvent (L) which is inert toward isocyanate groups. Examples of suitable solvents are the conventional paint solvents known per se, such as ethyl acetate, butyl acetate, ethylene glycol monomethyl or monoethyl ether acetate, 1-methoxy-2-propyl acetate, 3-methoxy-n-butyl acetate, acetone, 2-butanone, iso-butyl methyl ketone, 4-methyl-2-pentanone, cyclohexanone, cyclopentanone, toluene, xylene, chlorobenzene, white spirit, aromatics with relatively high degrees of substitution, such as are sold, for example, under the names Solventnaphtha®, Solvesso®, Shellsol®, Isopar®, Nappar® and Diasol®, propylene glycol diacetate, diethylene glycol dimethyl ether, dipropylene glycol dimethyl ether, diethylene glycol ethyl and butyl ether acetate, N-methylpyrrolidone, and N-methylcaprolactam, and also, preferably, carbonic esters or lactones, which are specified in EP-A1 697 424, page 4 lines 4 to 32, more preferably dimethyl carbonate, diethyl carbonate, 1,2-ethylene carbonate and 1,2-propylene carbonate, lactones such as β-propiolactone, γ-butyrolactone, ε-caprolactone, and ε-methylcaprolactone, or else any desired mixtures of such solvents.

It is also possible first to prepare the isocyanates of the invention without solvent and then to use a solvent (L) to take up the product thus obtainable.

The mixture optionally comprises, as component (D), at least one emulsifier obtainable by reacting a polyisocyanate with at least one compound (d) having at least one hydrophilic, non-isocyanate-reactive group (group D1) and precisely one isocyanate-reactive group (group D2).

The at least one polyisocyanate used in component (D) may be the same as or different from the at least one polyisocyanate (a). The at least one polyisocyanate used in component (D) is preferably the same as the at least one polyisocyanate (a). The at least one polyisocyanate used in component (D) may be any polyisocyanate, preferably a polyisocyanate as described in component (A). More preferably the at least one polyisocyanate in component (D) comprises at least one polyisocyanate (a1) and/or at least one polyisocyanate (a2).

At least one compound (d) means a mixture of two or more different compounds (d), with preference being given to one compound (d).

The at least one compound (d) can be a monomer, oligomer or polymer.

The at least one compound (d) comprises precisely one group which is reactive toward isocyanate (group D2).

For the purposes of the present invention, a group which is reactive toward isocyanate (group (D2) is a group which has hydrogen atoms that are reactive toward NCO groups or which can form an adduct with NCO groups under the normal process conditions in the reaction. These process conditions are known per se to those skilled in the art.

This group D2 is, for example, a hydroxy, mercapto, primary or secondary amino group (NH group for short), an epoxide, an acid anhydride group, a monophosphoric ether group or a carbodiimide group. Preference is given to a hydroxy, mercapto or primary or secondary amino group (NH group for short). Particular preference is given to a hydroxy group.

The at least one compound (d) comprises at least one hydrophilic group which is not reactive toward isocyanate (group D1).

For the purposes of the present invention, a group which is not reactive toward isocyanate (group D1) is a group which cannot form an adduct with NCO groups under the normal process conditions in the reaction. These process conditions are known per se to those skilled in the art.

The group D1 can be, for example, an ionic group or a group which can be converted into an ionic group.

Anionic groups or groups which can be converted into anionic groups are, for example, carboxyl groups or sulfonic acid groups.

Cationic groups or groups which can be converted into cationic groups are, for example, quaternary ammonium groups or tertiary amino groups.

Groups which can be converted into ionic groups are preferably converted into ionic groups before or during dispersion of the mixture according to the invention in water.

The conversion of, for example, carboxyl groups or sulfonic acid groups into anionic groups can be carried out using inorganic and/or organic bases such as sodium hydroxide, potassium hydroxide, potassium carbonate, sodium hydrogencarbonate, ammonia or primary, secondary and in particular tertiary amines, e.g. triethylamine or dimethylaminopropanol.

To convert tertiary amino groups into the corresponding cations, e.g. ammonium groups, suitable neutralizing agents are inorganic or organic acids, e.g. hydrochloric acid, acetic acid, fumaric acid, maleic acid, lactic acid, tartaric acid, oxalic acid or phosphoric acid, and suitable quaternizing agents are, for example, methyl chloride, methyl iodide, dimethyl sulfate, benzyl chloride, ethyl chloroacetate or bromoacetamide. Further suitable neutralizing agents and quaternizing agents are, for example, described in U.S. Pat. No. 3,479,310, column 6.

The content of ionic groups or groups which can be converted into ionic groups is preferably from 0.1 to 3 mol per kg of the sum of the components (A), (B), (C) and (D).

The group D1 can, for example, be a nonionic, hydrophilic group.

Nonionic groups are, for example, polyalkylene ether groups, in particular those having from 5 to 20 alkylene oxide units.

Preference is given to polyethylene ether groups or polyalkylene ether groups which comprise at least 7 ethylene oxide units in addition to other alkylene oxide units, e.g. propylene oxide.

The content of the hydrophilic nonionic groups, in particular the polyalkylene ether groups, is preferably from 1 to 30% by weight, particularly preferably from 5 to 20% by weight, based on the sum of the components (A), (B), (C) and (D).

Compounds suitable as at least one compound (d) are, for example, aliphatic, cycloaliphatic, araliphatic or aromatic hydroxysulfonic or aminosulfonic acids.

The at least one compound (d) is preferably hydroxyethanesulfonic acid, hydroxypropane-sulfonic acid, mercaptoethanesulfonic acid, mercaptopropanesulfonic acid, aminomethane-sulfonic acid, taurine, aminopropanesulfonic acid, N-cyclohexylaminopropanesulfonic acid, N-cyclohexylaminoethanesulfonic acid and also alkali metal, alkaline earth metal or ammonium salts thereof and particularly preferably the abovementioned monohydroxysulfonic acids and monoaminosulfonic acids.

The at least one compound b2) is likewise preferably polyalkylene ether alcohols, particularly preferably polyethylene ether alcohols.

The polyalkylene ether alcohols and polyethylene ether alcohols preferably have a molecular weight $M_n$ of at least 250 g/mol, particularly preferably at least 300 g/mol. The molecular weight $M_n$ can in principle have no upper limit, and is preferably up to 5000 g/mol, particularly preferably up to 2000 g/mol, very particularly preferably up to 1000 g/mol and in particular up to 800 g/mol.

Preferred OH numbers of the polyalkylene ether alcohols and polyethylene ether alcohols, measured in accordance with DIN 53240-2 (potentiometrically), are 40-350 mg KOH/g of solid resin, preferably 80-180 mg KOH/g of solid resin.

To prepare component (D), active as emulsifier, the at least one polyisocyanate is reacted with at least one compound (d).

The preparation of the component (D) is known, for example, from DE-A-35 21 618, DE-A-40 01 783 and DE-A-42 03 510.

In the preparation, the at least one compound (d) can be reacted with part of the component (A) and subsequently mixed with the remainder of the component (A).

However, the preparation can also be carried out by the at least one compound (d) being added to the total amount of the component (A) and the reaction then being carried out in the same reaction vessel.

Preferred components b) are those having hydrophilic, nonionic groups, in particular polyalkylene ether groups. The water-emulsifiability is here preferably achieved solely by means of the hydrophilic nonionic groups.

The mixtures of the invention comprise in solvent-free form preferably (A) 70-95% by weight,
(B) 2.5-20% by weight,
(C) 2.5-20% by weight,
(D) 0-15% by weight, where the sum of (A), (B), (C) and (D) makes 100% by weight.

The mixtures of the invention comprise in solvent-free form more preferably (a1) 30-70% by weight,
(a2) 10-50% by weight,
(B) 2.5-20% by weight,
(C) 2.5-20% by weight and
(D) 0-15% by weight, where the sum of (a1), (a2), (B), (C) and (D) makes 100% by weight.

The solvent (L) may be present, based on the overall mixture, in amounts of 0 to 60% by weight, preferably in amounts of 0 to 50% by weight.

The mixtures of the invention may be dispersed preferably in water for the purpose of preparing aqueous dispersions; with particular preference, the mixtures of the invention are mixed into aqueous dispersions.

The polyisocyanate formulation according to the invention is suitable for modifying aqueous coating compositions (paints, protective coatings), for example for wood, wood veneer, paper, paperboard, cardboard, textile, leather, nonwoven, plastics surfaces, glass, ceramic, mineral building materials such as cement moldings and fiber cement slabs, metals, or coated metals, adhesive or impregnating compositions, for coloring, for example, based on aqueous dispersions or solutions with a solids content of 5 to 40% by weight, preferably from 5 to 20% by weight. Suitable coating compositions include the aqueous dispersions, known per se, of homopolymers and copolymers of olefinically unsaturated monomers or polyurethanes or else solutions of natural substances, such as of casein, for example.

The polyisocyanate formulations of the invention are added to the aqueous coating compositions generally in an amount of 1 to 25%, preferably from 2.5 to 20% by weight, based on the solids content of the coating composition.

They are applied to the substrate in a known manner by means, for example, of spraying at a rate of 5 to 50 g solids/m$^2$.

Suitable dispersions of homopolymers or copolymers of olefinically unsaturated monomers are, for example, conventional dispersions of homopolymers or copolymers based on vinyl esters of carboxylic acids having 2 to 18, preferably 2 to 4, carbon atoms such as vinyl acetate in particular, if desired with up to 70% by weight, based on the total amount of olefinically unsaturated monomers, of other olefinically unsaturated monomers, and/or of homopolymers or copolymers of (meth)acrylic esters of alcohols having 1 to 18, preferably 1 to 4, carbon atoms, such as methyl, ethyl, propyl, hydroxyethyl or hydroxypropyl (meth)acrylates in particular, together if desired with up to 70% by weight of other olefinically unsaturated monomers, and/or butadiene-styrene copolymers having a butadiene content of about 20 to 60% by weight, and/or of other diene polymers or copolymers such as polybutadiene or copolymers of butadiene with other olefinically unsaturated monomers such as styrene, acrylonitrile and/or methacrylonitrile, for example, and/or aqueous dispersions of polymers or copolymers of 2-chloro-1,3-butadiene, if desired with other olefinically unsaturated monomers of the type exemplified above, e.g., those with a chlorine content of about 30 to 40% by weight, in particular a chlorine content of about 36% by weight.

Preference is given to aqueous dispersions of copolymers of 90 to 99.5% by weight of acrylates or methacrylates of alkanols comprising 1 to 4 carbon atoms and 0.5 to 10% by weight, based in each case on the copolymer, of hydroxyalkyl acrylates and methacrylates having 2 to 20 carbon atoms in the hydroxyalkyl radical, such as hydroxyethyl, hydroxypropyl or hydroxybutyl acrylate or methacrylate. Such dispersions are known per se and can be prepared conventionally by emulsion polymerization (see Houben-Weyl, Methoden der organischen Chemie, $4^{th}$ edition, vol. E 20, p. 217 ff.).

Suitable aqueous polyurethane dispersions are those of the type known per se, as described in, for example, U.S. Pat. No. 3,479,310, GB-A 1,076,688, U.S. Pat. Nos. 4,108, 814, 4,092,286, DE-A 2 651 505, U.S. Pat. No. 4,190,566, DE-A 2 732 131 or DE-A 2 811 148.

The aqueous dispersions used may comprise the customary auxiliaries and additives. These include, for example, fillers, such as quartz powder, quartz sand, highly disperse silica, heavy spar, calcium carbonate, chalk, dolomite or talc, which are often used together with suitable wetting agents such as polyphosphates, for example, such as sodium hexametaphosphate, naphthalenesulfonic acid, ammonium or sodium salts of polyacrylic acids, the wetting agents being added generally in amounts of 0.2 to 0.6% by weight, based on filler.

Further suitable auxiliaries are organic thickeners to be used in amounts, for example, of 0.01 to 1% by weight, based on the dispersion, such as cellulose derivatives, alginates, starch or starch derivatives or polyacrylic acid, or inorganic thickeners to be used in amounts of 0.05 to 5% by weight, based on the dispersion, such as bentonites, for example.

Fungicides for preservation may also be added to the dispersions. These are employed generally in amounts of 0.02 to 1% by weight, based on the dispersion. Examples of suitable fungicides are phenol and cresol derivatives or organotin compounds.

Substrates for impregnation are, for example, synthetic or nonsynthetic fibers and/or nonwovens or woven fabrics comprising such fibers.

The mixtures of the invention can be dispersed very finely in aqueous dispersions. Moreover, less of the water-emulsifiable polyisocyanate need be added in order to set the desired properties of the dispersion or to achieve the desired properties during application.

The mixtures of the invention can of course be provided with customary auxiliaries and additives of coatings technology. These include, for example, defoamers, thickeners, leveling assistants, pigments, emulsifiers, dispersing assistants, and also solvents. The desired processing viscosity is set by adding water.

To prepare the dispersions it is sufficient in the majority of cases to use simple emulsifying techniques, for example, with a mechanical stirrer, or else in many cases simple mixing of the two components by hand, in order to obtain dispersions having very good properties. Naturally it is also possible, however, to employ mixing techniques involving a relatively high shearing energy, such as jet dispersion, for example.

The coating compositions comprising the mixtures of the invention may be used in particular as primers, surfacers, pigmented topcoat materials, and clearcoat materials in the sector of automotive refinish or the painting of large-size vehicles. The coating compositions are particularly suitable for applications where particularly high application reliability, outdoor weathering stability, optical properties, solvent resistance, chemical resistance, and water resistance are required, such as in automotive refinishing and the painting of large-size vehicles.

The coating compositions comprising the mixtures of the invention may be applied by any of a wide variety of spraying methods, such as, for example, air-pressure, airless or electrostatic spraying methods using one-component or two-component spraying units, or else by spraying, troweling, knife coating, brushing, rolling, roller coating, flow coating, laminating, in-mold coating or coextrusion.

The coatings are generally dried and cured under normal temperature conditions, i.e., without heating the coating. Alternatively, the mixtures of the invention may be used to produce coatings which following application are dried and cured at elevated temperature, e.g., at 40-250° C., preferably 40-150° C., and especially at 40 to 100° C.

The examples which follow are intended to illustrate the properties of the invention but without restricting it.

EXAMPLES

Polyisocyanate Preparation

Raw Materials

Polyisocyanate a1

HDI isocyanurate having an NCO content of 22.2% and a viscosity of 2800 mPa*s at 23° C. (e.g. Basonat® HI 100 from BASF SE).

Polyisocyanate a2

IPDI isocyanurate having an NCO content of 17.3% (e.g. Vestanat T1890/100 from Evonik Industries).

Polyether Alcohol 1

Monofunctional polyethylene oxide, prepared starting from methanol and with potassium hydroxide catalysis, having an OH number of 112 (according to DIN 53240) and a molecular weight of 500 g/mol. The basic catalyst residues still present were subsequently neutralized with acetic acid and the product was desalted. The same procedure also removes potassium acetate that has formed.

Polyether Alcohol 2

Monofunctional polyethylene oxide, prepared starting from methanol and with potassium hydroxide catalysis, having an OH number of 160 (according to DIN 53240) and a molecular weight of 350 g/mol. The basic catalyst residues still present were subsequently neutralized with acetic acid and the product was desalted. The same procedure also removes potassium acetate that has formed.

Comparative Polyisocyanate 1

142.9 g of polyisocyanate a2 (70% in 3-methoxypropyl acetate) and 15.0 g of polyether alcohol 1 were reacted with addition of 0.022 g of zinc neodecanoate (50% in butyl acetate) as catalyst. After 2 hours at 90° C., the NCO content was 9.7%. Then 100.0 g of polyisocyanate a1 and 15.0 g of polyether alcohol 1 were added. After 2 hours at 90° C., the reaction was halted with addition of 0.110 g of p-toluenesulfonic acid (10% in polyether alcohol 1). The corresponding product has an NCO content of 12.8% and a viscosity of 4350 mPa·s at 23° C.

Comparative Polyisocyanate 2

142.9 g of polyisocyanate a2 (70% in 3-methoxypropyl acetate) and 15.0 g of polyether alcohol 2 were reacted with addition of 0.022 g of zinc neodecanoate (50% in butyl acetate) as catalyst. After 2 hours at 90° C., the NCO content was 9.1%. Then 100.0 g of polyisocyanate a1 and 15.0 g of polyether alcohol 2 were added. After 2 hours at 90° C., the reaction was halted with addition of 0.110 g of p-toluenesulfonic acid (10% in polyether alcohol 1). The corresponding product has an NCO content of 12.9% and a viscosity of 4900 mPa·s at 23° C.

Inventive Polyisocyanate 1

143.2 g of polyisocyanate a2 (70% in 3-methoxypropyl acetate) and 7.6 g of polyether alcohol 1 and 7.6 g of polyether alcohol 2 were reacted with addition of 0.022 g of zinc neodecanoate (50% in butyl acetate) as catalyst. After 2 hours at 90° C., the NCO content was 9.6%. Then 100.0 g of polyisocyanate a1 and 7.6 g of polyether alcohol 1 and 7.6 g of polyether alcohol 2 were added. After 2 hours at 90° C., the reaction was halted with addition of 0.110 g of p-toluenesulfonic acid (10% in polyether alcohol 1). The corresponding product has an NCO content of 12.7% and a viscosity of 3750 mPa·s at 23° C.

Inventive Polyisocyanate 2

143.2 g of polyisocyanate a2 (70% in 3-methoxypropyl acetate) and 7.6 g of polyether alcohol 1 and 7.6 g of polyether alcohol 2 were reacted with addition of 0.022 g of zinc neodecanoate (50% in butyl acetate) as catalyst. After 2 hours at 90° C., the NCO content was 9.7%. Then 100.0 g of polyisocyanate a1 and 7.6 g of polyether alcohol 1 and 7.6 g of polyether alcohol 2 were added. After 2 hours at 90° C., the reaction was halted with addition of 0.110 g of p-toluenesulfonic acid (10% in polyether alcohol 1). The reaction product was diluted further with addition of 3-methoxypropyl acetate to a solids content of 79.5%. The corresponding product has an NCO content of 12.1% and a viscosity of 1300 mPa·s at 23° C.

Comparative Polyisocyanate 3

143.2 g of polyisocyanate a2 (70% in 3-methoxypropyl acetate) and 3.8 g of polyether alcohol 1 and 11.4 g of polyether alcohol 2 were reacted with addition of 0.022 g of zinc neodecanoate (50% in butyl acetate) as catalyst. After 2 hours at 90° C., the NCO content was 9.7%. Then 100.0 g of polyisocyanate a1 and 3.8 g of polyether alcohol 1 and 11.4 g of polyether alcohol 2 were added. After 2 hours at 90° C., the reaction was halted with addition of 0.110 g of p-toluenesulfonic acid (10% in polyether alcohol 1). The reaction product was diluted further with addition of 3-methoxypropyl acetate to a solids content of 80.7%. The corresponding product has an NCO content of 11.8% and a viscosity of 1300 mPa·s at 23° C.

Comparative Polyisocyanate 4

143.2 g of polyisocyanate a2 (70% in 3-methoxypropyl acetate) and 11.4 g of polyether alcohol 1 and 3.8 g of polyether alcohol 2 were reacted with addition of 0.022 g of zinc neodecanoate (50% in butyl acetate) as catalyst. After 2 hours at 90° C., the NCO content was 9.7%. Then 100.0 g of polyisocyanate a1 and 11.4 g of polyether alcohol 1 and 3.8 g of polyether alcohol 2 were added. After 2 hours at 90° C., the reaction was halted with addition of 0.110 g of p-toluenesulfonic acid (10% in polyether alcohol 1). The reaction product was diluted further with addition of 3-methoxypropyl acetate to a solids content of 80.3%. The corresponding product has an NCO content of 12.1% and a viscosity of 1450 mPa·s at 23° C.

Results in Technical Application

Formulation

Comparative 1—Comparative 2—Example 1

Coating component I: 400.0 g of Liocryl AM 920 (acrylate-based aqueous polyol from Synthopol, OH number 60 mg KOH/g, 40% in water) were adjusted to a pH of 8.1 at room temperature by addition of dimethylethanolamine/water (1/1 mixture) with stirring (600 rpm) and then admixed with 16.0 g of butyl diglycol and 16.0 g of Solvesso as film-forming assistants. Lastly, 1.2 g of Hydropalat® WE3240 (from BASF SE) were added as wetting additive and the solids content was adjusted to 35.0% by weight with DI water.

The various polyisocyanates were added to dispersion (coating component I) and incorporated by hand with a wooden spatula for 30 seconds. Lastly the viscosity was adjusted using DI water to 30 sec from the DIN 4 cup.

Comparative 3—Comparative 4—Example 2

Coating component II: 200.0 g of Joncryl 8312 (acrylate-based aqueous polyol from BASF, OH number 100 mg KOH/g, 45% in water) were adjusted to a pH of 8.1 at room temperature by addition of dimethylethanolamine/water (1/1 mixture) with stirring (600 rpm) and then admixed with 5.0 g of butyl diglycol acetate and 14.0 g of butyl glycol acetate as film-forming assistants. Lastly, 1.2 g of Hydropalat® WE3240 (from BASF SE) were added as wetting additive and the solids content was adjusted to 38.0% by weight with DI water.

The various polyisocyanates were added to dispersion (coating component II) and incorporated by hand with a wooden spatula for 30 seconds. Lastly the viscosity was adjusted using DI water to 30 sec from the DIN 4 cup.

Immediately after their preparation, the formulations and comparative formulations obtained were drawn down using a 200 μm doctor onto a precoated white aluminum panel (30×10 cm) and stored under standard conditions (23° C., relative atmospheric humidity 50%) for 15 minutes. After that time, the coated aluminum panels obtained were dried in a drying cabinet at 60° C. for 30 minutes. After cooling, determinations were made of the gloss and turbidity (haze) of the resulting coatings in accordance with DIN 2813 and DIN 13803. A total of 5 measurements at different locations were carried out on each of the coated aluminum panels. The average values obtained from these measurements are listed in the tables below. Higher values denote better gloss values, whereas lower values denote better haze values.

Tests in Technical Application

Results

|  | Formulation | | |
| --- | --- | --- | --- |
|  | Comparative 1 | Comparative 2 | Example 1 |
| Coating component I [g] | 120.0 | 120.0 | 120 |
| Comparative polyisocyanate 1 [g] | 28.6 | | |
| Comparative polyisocyanate 2 [g] | | 28.4 | |
| Inventive polyisocyanate 1 [g] | | | 27.5 |
| Dist. water [g] | 33.8 | 33.3 | 32.0 |
| Incorporability by stirring (manual): (+): very good (−): poor | (−) | (+) | (+) |
| Appearance | clear | matt | clear |
| Gloss 20° | 79 | 28 | 78 |
| Gloss 60° | 89 | 64 | 88 |
| Haze | 41 | 207 | 44 |

|  | Formulation | | |
| --- | --- | --- | --- |
|  | Comparative 3 | Comparative 4 | Example 2 |
| Coating component II [g] | 100 | 100 | 100 |
| Comparative polyisocyanate 3 | 27.3 | | |
| Comparative polyisocyanate 4 | | 26.5 | |
| Inventive polyisocyanate 2 | | | 26.3 |
| Dist. water | 4 | 6 | 5 |
| Incorporability by stirring (manual) (+): very good (−): poor | (+) | (−) | (+) |
| Appearance | matt | clear | clear |
| Gloss 20° | 2 | 75 | 49 |
| Gloss 60° | 14 | 88 | 76 |
| Haze | 62 | 44 | 129 |

The invention claimed is:

1. A mixture, comprising
(A) at least one polyisocyanate (a),
(B) at least one emulsifier obtained by reacting at least one polyisocyanate with at least one polyether alcohol having a number average molecular weight of less than 400 g/mol,
(C) at least one emulsifier obtained by reacting at least one polyisocyanate with at least one polyether alcohol having a number average molecular weight of greater than 450 g/mol, and
(D) optionally at least one emulsifier obtained by reacting a polyisocyanate with at least one compound (d) having at least one hydrophilic, non-isocyanate-reactive group D1 and precisely one isocyanate-reactive group D2,
where a weight ratio of component (B) to component (C) is from 40:60 to 60:40.

2. The mixture according to claim 1, wherein
the at least one polyisocyanate (a) comprises at least one polyisocyanate (a1) and at least one polyisocyanate (a2),
the at least one polyisocyanate (a1) is an isocyanurate and/or biuret of 1,6-diisocyanatohexane, and
the at least one polyisocyanate (a2) is an isocyanurate of 1 isophorone diisocyanate.

3. The mixture according to claim 1, comprising in solvent-free form
70-95% by weight of component (A),
2.5-20% by weight of component (B),
2.5-20% by weight of component (C), and
0-15% by weight of component (D),
where a sum of (A), (B), (C) and (D) is 100% by weight.

4. The mixture according to claim 2, comprising in solvent-free form
30-70% by weight of polyisocyanate (a1),
10-50% by weight of polyisocyanate (a2),
2.5-20% by weight of component (B),
2.5-20% by weight of component (C), and
0-15% by weight of component (D),
where a sum of (a1), (a2), (B), (C) and (D) is 100% by weight.

5. The mixture according to claim 1, wherein the polyisocyanate in component (B) and/or component (C) comprises an isocyanurate and/or biuret of 1,6-hexamethylene-diisocyanate and/or comprises an isocyanurate of isophorone diisocyanate.

6. The mixture according to claim 1, wherein the polyether alcohol in component (B) and/or component (C) is obtained by reacting at least one saturated aliphatic alcohol having 1 to 4 carbon atoms in the alkyl radical with ethylene oxide, propylene oxide or a mixture thereof.

7. The mixture according to claim 1, wherein the polyether alcohol in component (B) and/or component (C) is obtained by reacting methanol with ethylene oxide.

8. The mixture according to claim 1, wherein the polyether alcohol in component (B) has a molecular weight ranging from 200 g/mol to 400 g/mol.

9. The mixture according to claim 1, wherein the polyether alcohol in component (C) has a molecular weight ranging from 450 g/mol to 650 g/mol.

10. A polymer dispersion, comprising a mixture according to claim 1.

11. A coating material, comprising the mixture according to claim 1.

12. A process for coating a substrate, the processing comprising:
  coating the substrate with a coating composition comprising the mixture according to claim 1.

13. A coating material, comprising the polymer dispersion according to claim 10.

* * * * *